Aug. 11, 1959   H. JENSEN   2,898,799
BINOCULAR OPTICAL SYSTEM
Filed July 2, 1954
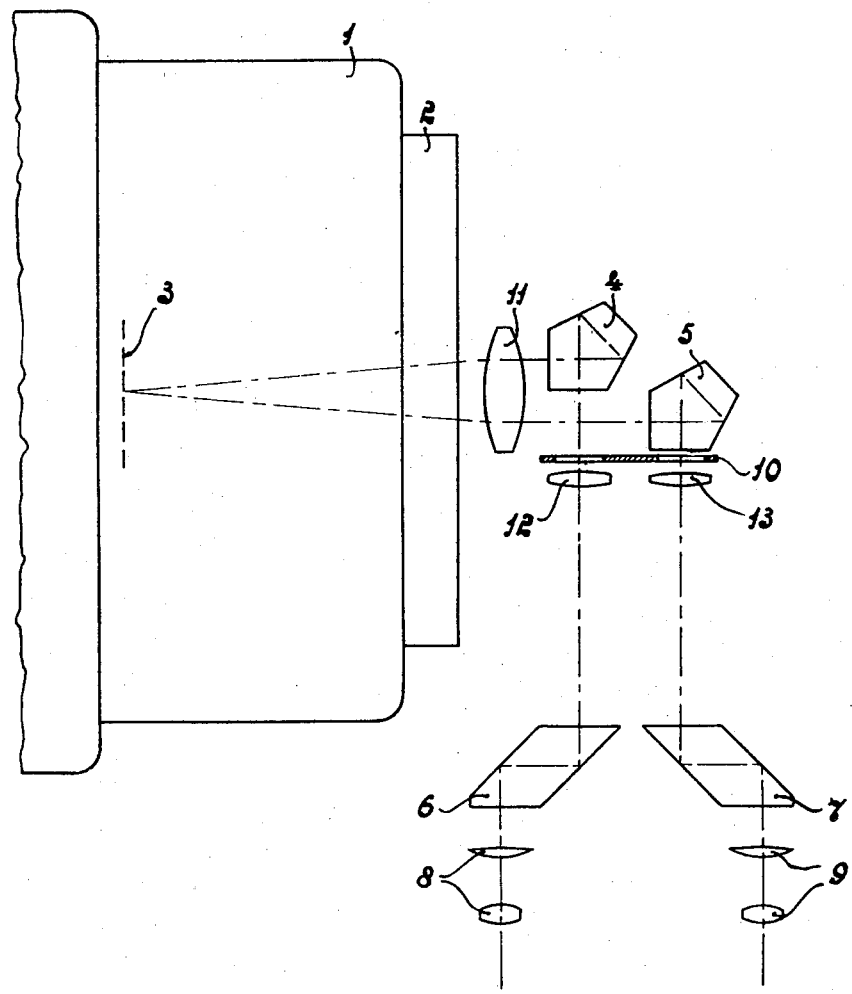
INVENTOR
Hans Jensen
BY Fred M Vogel
AGENT

United States Patent Office 2,898,799
Patented Aug. 11, 1959

---

2,898,799
BINOCULAR OPTICAL SYSTEM

Hans Jensen, Hamburg, Germany, assignor, by mesne assignments, to North American Philips Company, Inc., New York, N.Y., a corporation of Delaware Application July 2, 1954, Serial No. 441,063
Claims priority, application Germany July 11, 1953
3 Claims. (Cl. 88—1)

This invention relates to optical systems for lateral viewing of the image on the screen of an image intensifier.

In medical radiology it is known to convert the fluoroscopic images by means of an image intensifier into a smaller but considerably brighter optical image. Optical systems employed for investigating these images suffer from a limitation in that the spacing between the patient and the observer is increased, thus rendering it more difficult for the radiologist to handle the patient. In order to avoid this difficulty it has been proposed to use an optical system for intensifying fluoroscopic images, which comprises a prism by which the light rays from the brightly lighted screen of the image intensifier is turned through an angle of 90° so that the image is observed laterally, that is to say from a more convenient point relative to the patient.

In order to permit binocular vision with fluoroscopic image intensifiers, binocular systems have been used which are arranged in line with the axis of the image intensifier. If, when using such systems, lateral observation is desired difficulties are experienced due to the normally required equality of the optical path lengths and the arrangement of all the necessary system elements in the optically required position.

When using stereo-magnifying glasses of the usual type, an upright image is required to reappear upright. This is achieved by adding a prism system which permits the optical axes to the ocular to be sufficiently spaced from each other so that lenses, lense mounts and applicators having the diameters required for structural reasons may be juxtaposed. Certain image intensifiers, however, give an inverted image, of which the observation device is required to form an upright or erect image. This entails difficulties since the arrangement for setting the interpupillary distance would have to be provided at the optical axes located very closely together. This difficulty is still increased if a considerable free distance from the lens pupil of emergence is desired, since then the intermediate image projected by the objective has to be comparatively large.

The present invention permits the said disadvantages to be avoided by deflecting, in a binocular optical system associated with an image intensifier or convertor, the beam of light rays preferably by 90° and by making provision that the rays extend parallel to one another in the area of the optical means for obtaining an erect image.

In the case of parallel beams, the condition of equal path lengths may be dropped so that the lateral spacing between a pair of objectives in the system can be chosen at will in accordance with the structural requirements, thus obviating difficulties in arranging the system parts.

In order that the invention may be readily carried into effect, it will now be described by way of example, with reference to the sole figure of the accompanying drawing, in which one embodiment of the invention is shown diagrammatically and in which the reference numeral 1 denotes the housing of the image intensifying tube which as usual comprises an applicator or viewing window 2. The brightly lighted viewing screen on which an inverted image is produced is denoted by 3. In accordance with the invention provision is made that the rays extend parallel to one another between objectives 11 on the one hand and 12, 13 on the other hand. This may be effected by arranging the viewing screen 3 in the focal plane of the objective 11. The objectives 12 and 13 refocus the parallel rays in their separate optical paths, and the two images thus formed are erect or upright.

The image is maintained erect by means of pentagonal prisms 4 and 5 while the light paths are being rotated by 90°. The required interpupillary distance between the oculars 8 and 9 of the binocular viewing system is set in the usual way by means of two rotatable rhomboidal prisms 6 and 7. A diaphragm 10 is preferably disposed between the prisms 4, 5 and the objectives 12, 13.

What is claimed is:

1. In combination, an image intensifier having a viewing screen on which an inverted visible image is produced, and a binocular optical system for lateral viewing of said image in an upright position, said optical system comprising, in the order named, a first objective mounted in a position such that the said viewing screen extends in its focal plane whereby the light rays from the viewing screen are directly received by the first objective and after passing therethrough are maintained in parallel paths, a pair of pentagonal prisms mounted in the parallel paths of the light rays and deflecting them laterally but maintaining them parallel and at the same time maintaining the image in the position received, second and third objectives each optically coupled to one of the pentagonal prisms for refocusing the parallel light paths to reform the image in an upright position, and a pair of oculars cooperating with the said second and third objectives for binocular viewing of the reformed image.

2. In combination, an image intensifier having a given axis and including a viewing screen at right angles to said axis on which an inverted visible image is produced, and a binocular optical system for viewing of said image in an upright position and in the plane of the image intensifier axis from a position approximately at right angles to said axis, said optical system comprising, in the order named, a first objective aligned with said intensifier axis and mounted in a position such that the said viewing screen extends in its focal plane whereby the light rays from the viewing screen are directly received by the first objective and after passing therethrough are maintained in parallel paths, a pair of pentagonal prisms aligned with the image intensifier axis and mounted in the parallel paths of the light rays at different distances from the viewing screen and deflecting the light rays laterally but maintaining them parallel and at the same time maintaining the image in the position received, second and third objectives each optically coupled to one of the pentagonal prisms for refocusing the parallel light paths along the lateral path to reform the image in an upright position, and a pair of oculars cooperating with the said second and third objectives for binocular viewing of the reformed image.

3. The combination set forth in claim 2 wherein diaphragm means are interposed between the pentagonal prisms and the second and third objectives to isolate the optical paths of the coupled prisms and objectives.

References Cited in the file of this patent

UNITED STATES PATENTS

| 1,000,609 | Konig | Aug. 15, 1911 |
| 2,273,235 | Von Ardenne | Feb. 17, 1942 |
| 2,485,411 | Pratt et al. | Oct. 18, 1949 |
| 2,559,698 | Bahre | July 10, 1951 |
| 2,631,244 | Longini | Mar. 10, 1953 |

FOREIGN PATENTS

| 817,698 | France | May 31, 1937 |
| 822,109 | France | Sept. 13, 1937 |
| 153,325 | Great Britain | Nov. 3, 1920 |
| 343,850 | Germany | Nov. 9, 1921 |